United States Patent Office 2,960,539
Patented Nov. 15, 1960

2,960,539

PREPARATION OF ANTIOZONANTS FROM WOOD TAR DISTILLATE

Robert H. Rosenwald, Western Springs, and William K. T. Gleim, Island Lake, Ill., assignors, by mesne assignments, to Universal Oil Products Company, Des Plaines, Ill., a corporation of Delaware No Drawing. Filed Oct. 18, 1957, Ser. No. 690,917

3 Claims. (Cl. 260—613)

One aspect of the present invention relates to the treatment of hardwood tar distillate in order to produce a non-staining antiozonant therefrom.

The wood tar distillate for treatment in accordance with the present invention is obtained by the distillation of deciduous woods, i.e., angiosperms. Specific examples include hardwoods, as hickory, oak, beech, walnut, etc. The distillate so obtained is a complex mixture of phenolic and non-phenolic compounds. In accordance with the present invention, the wood tar distillate is converted into a non-staining antiozonant and, therefore, is utilizable in white or light-colored rubber and rubbery products.

In one embodiment the present invention relates to the process which comprises reacting hardwood tar distillate with an alkylene oxide at a temperature of from about 50° C. to about 300° C.

In a specific embodiment the present invention relates to the process which comprises reacting hardwood tar distillate with ethylene oxide at a temperature of from about 100° C. to about 200° C.

In a preferred embodiment the hardwood tar distillate is first settled in order to separate a settled tar oil from soluble oils. This settling may be effected at atmospheric temperature but preferably is effected at an elevated temperature ranging to about 100° C. The settling at elevated temperature also effects removal of volatile compounds from the wood tar distillate. In another embodiment, the soluble wood tar distillate may be treated in the present invention.

The wood tar distillate is subjected to treatment in accordance with the present invention, or the wood tar distillate is first separated into a selected fraction, commonly referred to as a heart cut, which preferably boils from about 250° C. to about 330° C. and more particularly from about 260° C. to about 320 C.

In accordance with the present invention, the wood tar distillate or selected fraction is reacted with an alkylene oxide. Ethylene oxide is particularly preferred for this purpose. Other alkylene oxides include propylene oxide, butylene oxide, amylene oxide, etc. The reaction is effected at a temperature of from about 50° C. to about 300° C. and more particularly from about 100° C. to about 200° C. and under sufficient pressure to maintain the ethylene oxide in substantially liquid phase. In general the pressure may range from about 10 to about 1000 pounds per square inch or more.

In most cases the reaction is effected in the absence of a catalyst. However, when desired, a catalyst may be used, and the catalyst may be either acidic as, for example, hydrochloric acid, sulfuric acid, etc., or an alkaline catalyst may be utilized as, for example, sodium hydroxide, potassium hydroxide, sodium carbonate, trialkylamines, etc. In some cases the use of a solvent is desirable. Any suitable solvent may be employed as, for example, benzene, toluene, xylene, cumene, decalin, chloroform, etc.

The mol ratio of ethylene oxide to wood tar distillate will depend upon the particular wood tar distillate being reacted. At least 1 mol of ethylene oxide is used per mol of the monomethyl ethers of alkylpyrogallols contained in the wood tar distillate. At least 2 mols of ethylene oxide is used per mol of alkylpyrogallols contained in the wood tar distillate. The alkylpyrogallols or monomethyl ethers of alkylpyrogallols contained in the wood tar distillate impart staining properties to the antiozonant and therefore are undesirable.

In the novel process of the present invention the monomethyl ethers of 5-alkylpyrogallols, as found in both settled and soluble tars, are converted into 2-methoxy-4-alkyl-6-(hydroxyethoxy)-phenol. In soluble tars, the 5-alkylpyrogallols generally are present in appreciable quantities, and they will be converted into derivatives of dihydroxyethoxy-alkylphenols and particularly 2,6-di-(hydroxyethoxy)-4-alkylphenols. Thus it will be noted that the alkylpyrogallols require at least 2 mols of ethylene oxide for conversion into desired di-(hydroxyethoxy)-alkylphenols, while the monomethyl ethers require only 1 mol of ethylene oxide.

It will be noted that the present invention converts polyhydroxybenzenes into phenols (monohydroxybenzenes). The polyhydroxybenzenes are undesirable because they impart discoloring properties to the antiozonant and, in accordance with the present invention, these undesirable polyhydroxy compounds are converted into monohydroxy compounds. As will be shown by the appended examples the treated wood tar distillate is non-staining and is an effective antiozonant.

The wood tar distillate also contains 2,6-dimethoxy-4-alkylphenols which are non-staining and effective antiozonants. As another important feature of the present invention, the alkylene oxide reacts selectively with the polyhydroxybenzene compounds but does not react with the 2,6-dimethoxy-4-alkylphenols in the wood tar distillate. Thus the polyhydroxybenzene compounds are reduced to a very low concentration in the final product without adversely affecting the desirable monohydroxy compounds in the wood tar distillate.

Following the reaction of alkylene oxide and wood tar distillate, the product may be utilized as such or, when desired, it may be fractionated to separate a selected fraction of still higher potency. For example, in the reaction, products boiling above the boiling point of the charge are produced, and these higher boiling products are of higher potency for use as antiozonants. In general, the initial boiling point of this higher boiling fraction will be in the range of from about 300° C. to about 320° C. and this fraction will contain all of the products boiling above the boiling point of the charge. This separation is readily accomplished by fractional distillation, such distillation generally carried out under reduced pressure in order to avoid any possible decomposition during the fractionation due to elevated temperatures.

As set forth above, the present invention produces an antiozonant product of non-staining properties and of high potency. However, when an antiozonant product of even higher potency is desired, in another embodiment of the invention the treated wood tar distillate may be treated further to remove the last traces of polyhydroxybenzene compounds. In one method this is accomplished by forming salts with sodium hydroxide, the salts of the polyhydroxybenzene compounds being soluble in the treating solution, while the salts of the monohydroxybenzene compounds are not soluble therein. In this way the undesired polyhydroxybenzene compounds are additionally removed from the product.

Because reaction of the wood tar distillate with alkylene oxide reduces the concentration of polyhydroxybenzene compounds, further treatment with sodium hydroxide or other salt forming reagent is considerably facilitated. Thus, the combination of the two treatments serves to reduce the polyhydroxybenzene content of the wood tar distillate to a very low amount.

While the novel features of the present invention are particularly applicable for use in improving wood tar distillate, it is understood that, in another aspect, the invention may be used to convert pyrogallol, 5-alkylpyrogallols, monoalkyl ethers of pyrogallol and monoalkyl ethers of 5-alkylpyrogallols obtained from any other source.

The products of the present invention are of especial utility in preventing ozone cracking of white or light-colored rubber. Most of the light-colored rubber now being manufactured commercially is prepared from natural rubber and, therefore, these antiozonants are particularly suitable for use in light-colored natural rubber. However, it is necessary that dark-colored rubber molded with or otherwise adjoining light-colored rubber also must contain a non-staining antiozonant, and the antiozonants recovered by the present invention, therefore, advantageously are utilized in such dark-colored rubber.

Natural rubber generally is regarded as comprising naturally occurring isoprene polymers. The natural rubbers include Hevea rubber, caoutchouc, balata, gutta percha, etc. Although natural rubber appears to have better tear resistance during normal service than synthetic rubber, natural rubber does undergo ozone cracking and, in unusual service or long periods of service, does fail because of ozone cracking. Furthermore, the presence of cracks in rubber products also is objectionable for aesthetic reasons. Customers and users of rubber products object to the unsightly cracks in the rubber and, therefore, it is important that such cracks be avoided.

While the antiozonant is particularly applicable for use in light-colored natural rubber and the dark-colored rubber associated therewith, it is understood that the antiozonant may be used for the stabilization of other dark-colored natural rubber, as well as for preventing ozone cracking of synthetic rubber. Much of the synthetic rubber now being produced commercially is known in the art as GR–S rubber and is a copolymer of butadiene and styrene. Other synthetic rubbers include those produced from butadiene and acrylonitrile (Buna–N), butadiene and isobutylene (butyl rubber), etc. Still other synthetic rubbers include Thiokol rubber, silicone rubber, neoprene rubber, etc.

It is understood that the antiozonant is utilized in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the so-called acid process. Furthermore, it is understood that the antiozonant can be used in reclaims and latices of rubbery materials, whether or not admixed with fillers, pigments, accelerating agents, etc. In another embodiment the antiozonant can be utilized for the stabilization of adhesives, elastomers, etc. which tend to crack due to ozone.

In general, the antiozonant is utilized in a concentration of from about 0.25% to about 10% by weight of the rubber hydrocarbon and preferably in a concentration of from about 2% to about 5% by weight thereof. These concentrations are based on the rubber hydrocarbon, exclusive of the other components of the final rubber composition, and are used in this manner in the present specifications and claims. It is understood that the antiozonant is utilizable along with other additives incorporated in rubber for specific purposes including, for example, antioxidants, accelerators, softeners, extenders, wax, reinforcing agents, etc.

The antiozonant normally is employed along with certain commercial antioxidants which are incorporated in the latex prior to milling with the other components of the rubber. In this embodiment, the antiozonant thus is used along with a separate antioxidant. Any suitable antioxidant may be employed including, for example, phenyl, beta-naphthylamine, 6-phenyl-2,2,4-trimethyl-1,2-dihydroquinoline, marketed under the trade name of "Santoflex-B," 2,2'-methylene-bis-(4-methyl-6-tert-butyl-p-cresol), the reaction product of acetone and diphenylamine, marketed under the trade name of "B.L.E.," etc. These antioxidants generally are used in a concentration of from about 0.5% to about 3% by weight of the rubber.

The antiozonant also normally is employed along with paraffin and/or microcrystalline wax. The wax generally is utilized in a concentration of from about 0.5% to about 3% by weight of the rubber.

In one embodiment, the antiozonant of the present invention is admixed with the antioxidant and/or wax, and the mixture then is composited with one or more of the other components of the rubber composition.

The antiozonant is incorporated in the rubber or rubbery product in any suitable manner and at any suitable stage of preparation. When the antiozonant is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a powder, paste, etc.

The following examples are introduced to illustrate further the novelty and utility of the present invention but not with the intention of unduly limiting the same.

Example I 15,060 grams of hardwood tar distillate having a boiling range of from 116° C. to 322° C. was reacted with 1880 grams of ethylene oxide. The wood tar distillate had a polyhydroxybenzene content of 26% by weight and, as hereinbefore explained, these compounds impart staining properties. The reaction was effected at 100° C. for a period of ten hours. The temperature rose slightly during the reaction and reached to 103° C. Following the reaction unreacted ethylene oxide was bled off. 16,684 grams of reaction product was recovered.

A rubber of the following recipe was utilized in evaluating the products of the present and following examples.

| Ingredients: | Parts by weight |
|---|---|
| (1) Pale crepe rubber | 100 |
| (2) Stearic acid | 3 |
| (3) Zinc oxide | 5 |
| (4) Sulfur | 3 |
| (5) Benzothiazyl disulfide | 1 |
| (6) Antiozonant | 3 |

The rubber samples were subjected to dynamic tests for a period of 22 hours in an atmosphere containing 25 parts of ozone per 100 million parts of air at a temperature of about 100° F. The rubber samples were flexed 320 times per minute, with an elongation of from 0 to 20%.

When a sample of the rubber not containing antiozonant was evaluated in the above manner, the rubber was badly cracked. Another sample of the rubber which contained 3% by weight of wood tar distillate which had not been treated in accordance with the present invention was very badly discolored after exposure in the manner described above.

In contrast to the above results, a sample of the rubber containing 3% by weight of wood tar distillate which had been treated in the manner described previously in this example was free from cracks after 22 hours' exposure in the manner described above. There was only a very slight discoloration of the rubber. Therefore, the wood tar distillate treated in the above manner is satisfactory for light-colored rubber or rubbery products.

Example II

A portion of the wood tar distillate treated in the manner described in Example I was fractionated to separate material boiling above 320° C. This fraction amounted to 12% by volume of the total treated wood tar distillate and had a polyhydroxybenzene content of less than 0.8% by weight. When evaluated in the same manner as described in Example I and in another sample of the rubber, the sample containing the higher boiling fraction of the wood tar distillate was free from cracks and showed no discoloration. Therefore, this fraction of the treated wood tar distillate is especially useful in white rubber or rubbery products.

*Example III*

Hardwood tar distillate was fractionated to separate a heart cut having a boiling range of about 260° C. to 322° C. This heart cut contained 23% by weight of polyhydroxybenzene compounds. 16,520 grams of the heart cut was reacted with 1898 grams of ethylene oxide at 100° C. for a period of 14 hours. Unreacted ethylene oxide was bled off. 18,322 grams of treated product was obtained.

When evaluated in another sample of the rubber and in the same manner as described in Example I, the rubber containing 3% by weight of the treated wood tar distillate was free from cracks. There was a very slight discoloration of the rubber and, therefore, the antiozonant is satisfactory for use in light-colored rubber.

*Example IV*

The treated wood tar distillate of Example III was fractionated to separate compounds boiling above 300° C. This higher boiling fraction amounted to 28% of the treated wood tar distillate and had a polyhydroxybenzene content of 0.6% by weight.

When evaluated in another sample of the rubber and in the same manner as described in Example I, the rubber sample containing 3% by weight of this higher boiling fraction was free from cracks after 22 hours' exposure in the ozone cabinet, and the rubber showed no discoloration. Thus, this antiozonant is particularly suitable for use in white rubber.

*Example V*

77 grams of 2-methoxy-4-methyl-6-hydroxyphenol was reacted with 39 grams of ethylene oxide at 100° C. The product was fractionated to separate a middle fraction which titrated to a value of 5.2 meq./gm. This is near the theoretical value of 5.05 for the monohydroxy derivative. The calculated carbon is 60.59 and the found carbon is 58.75. The calculated hydrogen is 7.12 and the found hydrogen is 7.23. From these analyses, the middle fraction corresponds to 2-methoxy-4-methyl-6-(hydroxyethoxy)-phenol.

The fraction separated in the above manner was utilized, in a concentration of 3% by weight of rubber hydrocarbon, in another sample of the rubber described in Example I. After 6 hours' exposure to an atmosphere containing 25 parts of ozone per 100 million parts of air, the sample of rubber was free from cracks. On the other hand the control sample (not containing the antiozonant) of the rubber, when evaluated in the same manner, underwent considerable cracking.

We claim as our invention:

1. A process for producing a non-staining antiozonant from wood tar distillate containing 2,6-dimethoxy-4-alkylphenols, 5-alkylpyrogallols and monomethyl ethers of 5-alkylpyrogallols, which comprises subjecting said distillate to the action of alkylene oxide at a temperature of from about 50° C. to about 300° C. and selectively reacting the alkylene oxide with said pyrogallol compounds without conversion of said 2,6-dimethoxy-4-alkylphenols, the amount of alkylene oxide being such as to convert 5-alkylpyrogallols to 2,6-di-(hydroxyalkoxy)-4-alkylphenols and to convert monomethyl ethers of 5-alkylpyrogallols to 2-methoxy-4-alkyl-6-(hydroxyalkoxy)-phenol, and recovering the thus treated distillate.

2. The process of claim 1 further characterized in that said alkylene oxide is selected from the group consisting of ethylene oxide, propylene oxide, butylene oxide and amylene oxide.

3. The process of claim 1 further characterized in that said alkylene oxide is ethylene oxide.

References Cited in the file of this patent

UNITED STATES PATENTS

| | | |
|---|---|---|
| 1,651,617 | Moser | Dec. 6, 1927 |
| 2,015,115 | Kyrides | Sept. 24, 1935 |
| 2,133,972 | Coleman et al. | Oct. 25, 1938 |
| 2,158,957 | Coleman et al. | May 16, 1939 |
| 2,313,385 | Levesque | Mar. 9, 1943 |
| 2,428,235 | Marple et al. | Sept. 30, 1947 |
| 2,459,540 | Rosenwald | Jan. 18, 1949 |
| 2,670,340 | Kehe | Feb. 23, 1954 |
| 2,789,108 | Mills et al. | Apr. 16, 1957 |

OTHER REFERENCES

Schultes: Ber. deut. chem., vol. 69 (1936), pages 1870–73 (4 pages). Abstracted in Chem. Abstracts, vol. 30 (1936), col. 6723 (1 page).